United States Patent

[15] 3,700,987

Deering

[45] Oct. 24, 1972

[54] PULSE MODULATION MOTOR CONTROL

[72] Inventor: Charles S. Deering, Richardson, Tex.

[73] Assignee: E-System, Inc., Dallas, Tex.

[22] Filed: March 29, 1971

[21] Appl. No.: 128,962

[52] U.S. Cl. ................318/227, 318/230, 318/231, 318/341
[51] Int. Cl. .............................................H02p 5/40
[58] Field of Search.......318/227, 230, 231, 341, 599

[56] References Cited

UNITED STATES PATENTS

| | | | |
|---|---|---|---|
| 3,260,912 | 7/1966 | Gregory | 318/341 |
| 3,308,307 | 3/1967 | Moritz | 318/341 X |
| 3,310,758 | 3/1967 | Cottrell | 318/341 X |
| 3,346,794 | 10/1967 | Stemmler | 318/227 |
| 3,538,458 | 11/1970 | Lawson | 318/341 X |
| 3,559,008 | 1/1971 | Stut et al | 318/341 X |

Primary Examiner—Gene Z. Rubinson
Attorney—James D. Willborn and Richards, Harris & Hubbard

[57] ABSTRACT

A typical alternating current servomotor has two windings displaced 90°; these windings are identified as a reference winding and a control winding. Rotational direction and speed of the motor may be controlled by applying AC voltages of the proper wave form, amplitude and phase relationship to these windings. When controlling the direction of rotation and speed of the motor in accordance with a DC error signal, pulse width modulation techniques are employed. The error signal is compared with a triangular wave function to generate a first and second series of pulses each having a width related to the magnitude of the error signal. These series of pulses are logically combined with a square wave function to produce first and second digital motor energizing signals. The motor energizing signals control a power amplifier switch connected to the windings of the motor to be controlled.

17 Claims, 9 Drawing Figures

INVENTOR:
CHARLES S. DEERING

Richards, Harris & Hubbard
ATTORNEYS

INVENTOR:
CHARLES S. DEERING

PULSE MODULATION MOTOR CONTROL

This invention relates to control of an alternating current in accordance with a DC error signal, and more particularly to pulse modulation control of an alternating current.

Alternating current motors are extensively used in control systems both in ground based applications and airborne systems. A typical application of an alternating current servomotor in an airborne application is the positioning of aircraft control surfaces, such as the ailerons, and the vertical and horizontal stabilizer. Although the invention will be described with reference to the control of an alternating current servomotor; it is not intended to be limited thereto.

Normally, in the use of an AC servomotor the so called reference winding is energized from a constant alternating current source and a variable AC voltage is applied to the control winding in order to control the functioning (e.g. speed, torque, direction of rotation, power, etc.) of the motor. With the present invention, it is also possible to control the above functions of a servomotor by applying a variable AC voltage to both the reference winding and the control winding. The invention, however, will be described with reference to a system that applies a variable AC voltage to the control winding only.

When controlling the operation of an alternating current motor in accordance with a DC error signal using modulation techniques, both pulse width modulation and amplitude modulation have been employed. In pulse width modulation, the magnitude of the error signal determines the width of constant amplitude pulses at a selected frequency. This is in contrast to the more commonly used amplitude modulation scheme wherein the magnitude of the error signal determines the amplitude of a sinusoidal voltage of a given frequency. With either pulse width modulation or amplitude modulation, the output from the modulator is applied to a power amplifier for direct control of the energization of the control winding of the servomotor. With pulse width modulation, the power amplifier output transistors operate in a switching mode, i.e., the transistors operate at either saturation or cutoff. This reduces the average power dissipated in the power amplifier in comparison to the power dissipated in the power amplifier of an amplitude modulation scheme wherein the transistor continuously uses power.

In accordance with the present invention, a system for controlling an alternating current in accordance with an error signal includes a first comparison of a linearly varying periodic function with the error signal to generate a first series of pulses each having a width related to the magnitude of the error signal. A second comparison of the linear varying function with the error signal is made to generate a second series of pulses also each having a width related to the magnitude of the error signal. Both generated series of pulses are combined with a periodically varying function to produce a first and second energizing signal, the phase relationship of these energizing signals controls the functions (i.e., phase, magnitude, etc.) for an alternating current. Control of the alternating current by the energizing signals is by means of a switching circuit connected to a DC power source and to an AC driven device. The switching circuit, as operated by the energizing signals, produces an effective alternating current excitation for the driven device from the DC power source.

In accordance with a more specific embodiment of the invention, the generation of the second series of pulses is accomplished by inverting the linearly varying periodic function, which may be a triangular wave function, and comparing the inverted triangular shaped wave with the error signal.

Further, in accordance with this invention, the second series of pulses is generated by inverting the error signal and comparing the inverted signal with the linearly varying periodic function.

In accordance with a still more specific embodiment of the invention, the second series of pulses is generated by inverting the error signal and comparing this inverted signal with the linearly varying periodic function. The first and second series of pulses are combined to produce a first and second intermediate series of pulses. These intermediate pulses signals are then combined to produce the first and second energizing signals.

A more complete understanding of the invention and its advantages will be apparent from the specification and claims and from the accompanying drawings illustrative of the invention.

Referring to the drawings.

Figure 1:
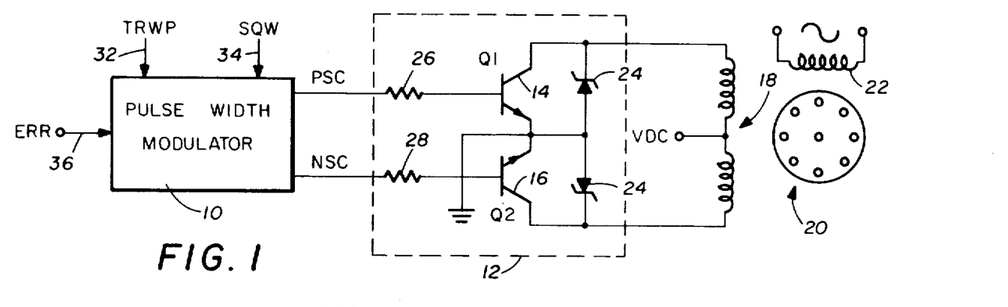
FIG. 1 is a simplified block diagram of a pulse width modulation servomotor control system.

Referring to FIG. 1 A pulse width modulator 10 receives three input signals and generates two digital motor energizing outputs that are inputs to a power amplifier 12. As illustrated, the power amplifier 12 comprises switching transistors 14 and 16 connected through collector electrodes to a center tapped control winding 18 of a two-phase servomotor 20. The center tap of the control winding 18 connects to a DC power source. Typically, the servomotor 20 includes, in addition to the control winding 18, a reference winding 22 connected to a source of alternating current. By varying the voltage applied to the winding 18 and the phase thereof in relationship to the voltage applied to the reference winding 22, the speed, torque, direction of rotation, power, etc. of the motor 20 may be controlled.

Through operation of the power amplifier 12, both the level and phase of the voltage applied to the control winding 18 may be varied to control the functioning of the motor 20. The power amplifier 12 includes the transistors 14 and 16 functioning in a switching mode; that is, the transistors operate at either saturation or in a cutoff mode. Two Zener diodes 24 limit the voltage transients that occur when the control winding 18 currents are switched. Switching transistors 14 and 16 have a common emitter connection to ground. Control of the transistor 14 is provided through a base drive resistor 26 connected to the PSC motor energizing output signal of the pulse modulator 10 and control of the transistor 16 is provided through a base drive resistor 28 connected to the NSC motor energizing output signal of the modulator 10.

In operation of the power amplifier 12 to control the operation of the servomotor 20, the digital motor energizing outputs, PSC and NSC, from the pulse width modulator 10 alternately switch the transistors 14 and 16 between a saturation mode and a cutoff mode. When one of the transistors 14 and 16 is operating saturated, the other is operating cutoff. Digital signals from the modulator 10 are phased such that the transistors 14 and 16 alternate between a saturated and a cutoff mode of operation. Thus, each half of the control winding 18 is alternately energized or de-energized. This produces an effective alternating current in the control winding 18 at a level determined by the saturation time of the transistors 14 and 16 to thus control the functioning of the motor 20. The direction of rotation of the motor 20 is determined by the phase relationship of the digital outputs PSC and NSC of the pulse width modulator 10.

To generate the motor energizing digital outputs, PSC and NSC, the three inputs to the pulse width modulator 10 are a linearly varying periodic function (e.g., a triangular wave function) applied to an input line 32, a periodically varying function (e.g., a square wave) applied to an input line 34, and an error signal varying plus and minus of zero applied on an input line 36. The linearly varying periodic function (TRWP) applied to the input line 32 when compared with the error signal (ERR) of the input line 36 determines the duration of conduction of the transistors 14 and 16, thereby determining the average value of the voltage applied to the control winding 18. The periodically varying function (SQW) applied to the input line 34 establishes the sequence of switching of the transistors 14 and 16 and thereby determines the direction of rotation of the servomotor 20.

Figure 2:
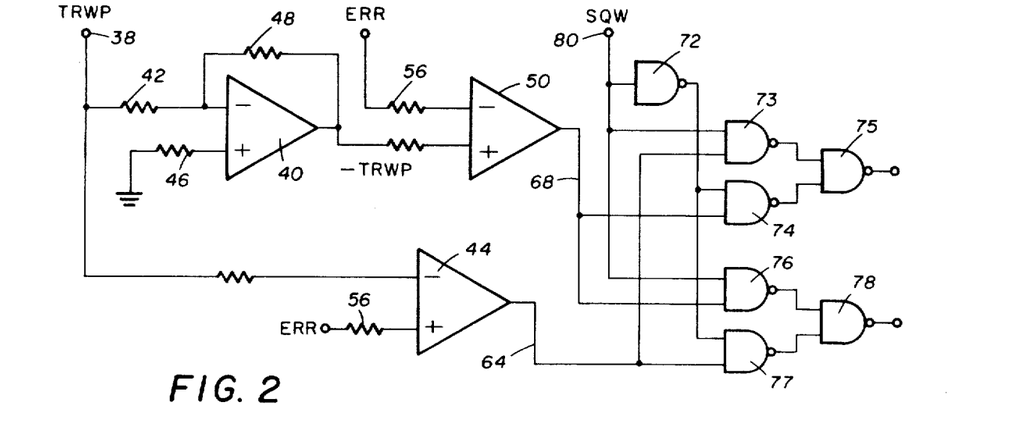
FIG. 2 is a schematic of a pulse width modulator for generating motor control signals by the comparison of an error signal with a linearly varying periodic function and the inverse of this function.

A pulse width modulator in accordance with the present invention for generating the motor energizing signals PSC and NSC is shown schematically in FIG. 2. A linearly varying periodic function (TRWP) is applied to an input terminal 38 which connects to an inverter amplifier 40 through a resistor 42 and one input of a comparator amplifier 44. The inverter amplifier 40 generates the inverse of the TRWP signal applied to the terminal 38. Amplifier 40 may be a conventional operational amplifier with one input connected to ground through a resistor 46 and a feedback loop including resistor 48. An output signal of the amplifier 40 is applied to one input of a comparator amplifier 50 of a type similar to the comparator amplifier 44, both of a conventional design. A second input to each of the comparator amplifiers 44 and 50 is the error signal (ERR) applied to an input resistor 56.

Figure 3A:
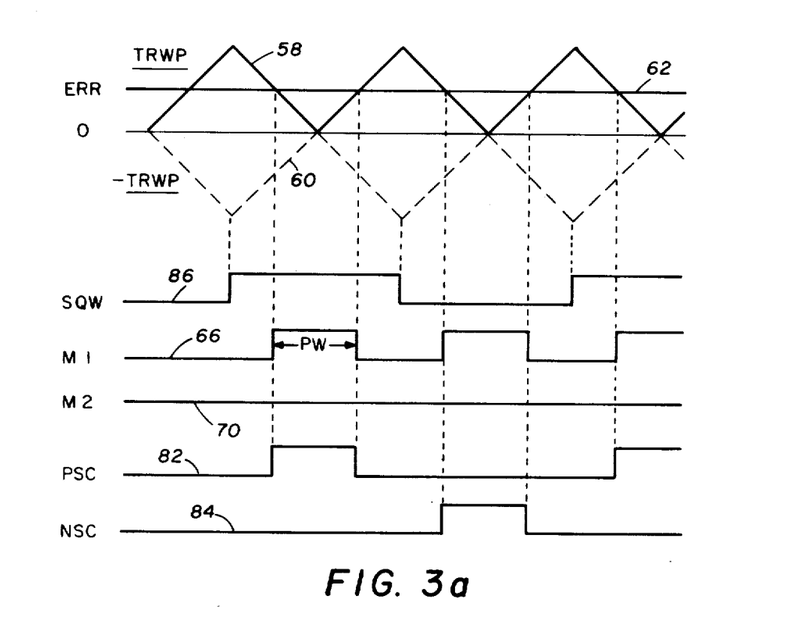
FIGS. 3a and 3b are wave forms illustrating the operation of the circuit of FIG. 2 when the input is positive or negative, respectively.

Comparator amplifiers 44 and 50 operate to produce a first and second series of pulses with the width of each pulse related to the magnitude of the error signal. Referring to FIG. 3a, the TRWP signal applied to the terminal 38 is illustrated by the wave form 58 with the inverse thereof illustrated by the wave form 60. Wave form 58 varies between zero volts and a positive peak voltage that is greater than or at least equal to the maximum value of the ERR signal. A positive error signal is shown to be applied to the inputs of the comparator amplifier, as indicated by the curve 62. A voltage having the wave form 58 is applied to the comparator amplifier 44 and the ERR signal is compared with the TRWP signal to produce a series of output pulses on line 64. With the amplifier 44 connected as illustrated, when the TRWP signal is greater than or equal to the error signal, the voltage on line 64 is at a logic ZERO level. When the error signal is greater than the TRWP signal, the amplifier 44 generates a logic ONE level voltage on the line 64. The output of the amplifier 44 with a positive ERR signal is illustrated in FIG. 3a by the wave form 66. Thus, each time the TRWP signal is less than the ERR signal an output pulse is produced on the line 64. The width of each pulse is proportional to the magnitude of the ERR signal.

Simultaneously with the operation of the comparator amplifier 44, the inverse of the TRWP signal (i.e., −TRWP) is applied to one input of the comparator amplifier 50. With the amplifier 50 connected as shown, if the ERR signal is greater than or equal to the −TRWP signal, the output of the amplifier 50 on line 68 will be logic ZERO. When the −TRWP signal is greater than the ERR signal, the output of the amplifier 50 will be at a logic ONE level. With the ERR signal given by the curve 62 in FIG. 3a, the −TRWP will also be less than the ERR signal, and the output of the amplifier 50 will be a logic ZERO level as indicated by the curve 70. The relationships for determining the output level of the comparator amplifiers 44 and 50 are as follows:

Amplifier 44 output = logic ZERO, if ERR ≤ TRWP
= logic ONE, if ERR > TRWP
Amplifier 50 output = logic ZERO, if ERR ≥ −TRWP
= logic ONE, if ERR < −TRWP.

To generate the motor energizing signals PSC and NSC, the digital outputs of the amplifiers 44 and 50 are logically combined with a periodically varying function (SQW) in logic circuitry consisting of NAND gates 72 through 78. To logically combine the periodically varying function with the outputs of the amplifiers 44 and 50, the SQW signal is a logic signal that alternates periodically between logic ONE and logic ZERO. Line 64 from the amplifier 44 connects to inputs of the NAND gates 73 and 77 and the line 68 from the comparator amplifier 50 connects to an input of the NAND gates 74 and 76. Also connected to the NAND gates 73 and 76 is the SQW signal applied to ther terminal 80. The SQW signal is also applied to the input of the NAND gate 72 which inverts the logic level thereof to produce the signal $\overline{SQW}$. Signal $\overline{SQW}$ is applied to the second input of the NAND gates 74 and 77. Output terminals of the NAND gates 73 and 74 are connected to inputs of the NAND gate 75 which produces at an output terminal the PSC motor energizing signal applied to the transistor 14. Similarly, outputs of the NAND gates 76 and 77 are applied to the inputs of the NAND gate 78 which produces the NSC motor energizing signal applied to the transistor 16.

Operation of the logic circuitry of FIG. 2 follows the usual "AND" and "ORING" functions of such circuitry. Table 1 lists the outputs of each of the NAND gates 73 through 78.

TABLE 1

| NAND Gate | Output Function |
|---|---|
| 73 | $\overline{SQW \cdot M1}$ |
| 74 | $\overline{SQW \cdot M2}$ |
| 75 | $PSC = SQW \cdot M1 + \overline{SQW} \cdot M2$ |
| 76 | $\overline{\overline{SQW} \cdot M2}$ |
| 77 | $\overline{SQW \cdot M1}$ |
| 78 | $NSC = SQW \cdot M2 + \overline{SQW} \cdot M1$ | where M1 and M2 are the outputs of the comparator amplifiers 44 and 50, respectively.

With the error signal as given by curve 62 of FIG. 3A, outputs of the NAND gates 75 and 78 are shown by the wave forms 82 and 84, respectively. At each occurrence of a positive pulse (a logic ONE level signal) in the wave form 82 the transistor 14 switches into a saturation mode and energizes the upper half of the control winding 18. Likewise, for each occurrence of a positive pulse (a logic ONE level signal) in the wave form 84, the transistor 16 switches into a saturation mode to energize the lower half of the winding 18. Note, that with the phase relationship as illustrated in FIG. 3a between the wave forms 82 and 84, the servomotor 20 will have a predetermined direction of rotation. This direction of rotation is established by the positive value of the ERR signal.

Note also, that the logic ONE level pulses of the wave form 82 occur during the logic ONE level of the SQW signal as illustrated by the wave form 86. During the logic ZERO level of the SQW signal the logic ONE level pulses of the NSC signal are generated at the output of the NAND gate 78.

Figure 3B:
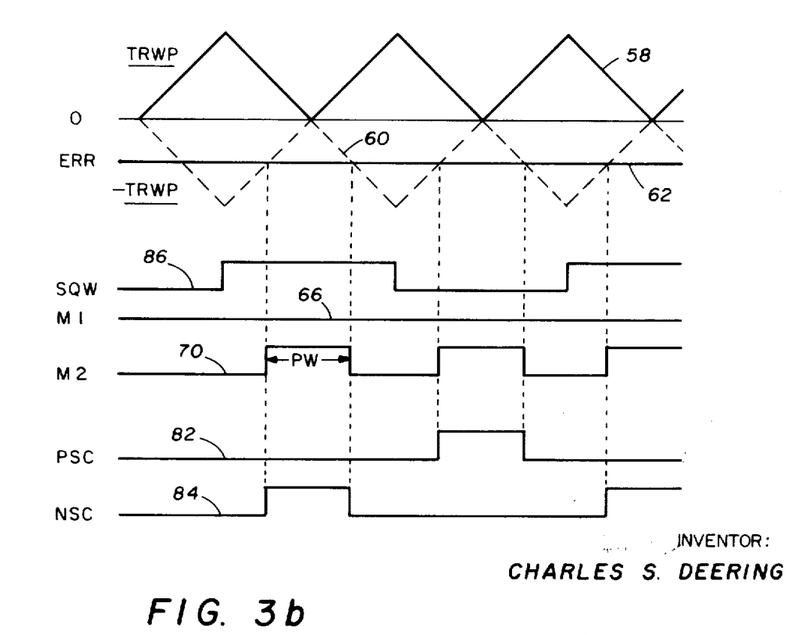

When the ERR signal applied to the comparator amplifiers 44 and 50 has a negative value, the operation of the circuit of FIG. 2 is given by the wave forms of FIG. 3b. The same reference numerals are used in FIG. 3b as used in FIG. 3a to identify the various wave forms. When the ERR signal has a negative value, the TRWP signal applied to the comparator amplifier 44 will always be greater and the output of the amplifier on line 64 will be at a logic ZERO level. However, a negative value ERR signal will now produce logic ONE level digital pulses on the line 68 at the output of the comparator amplifier 50. These pulses will be generated each time the −TRWP signal is greater than the ERR signal. Again, the pulse width will be related to the magnitude of the ERR signal. Note, that the NSC motor energizing pulses now occur during the logic ONE level of the SQW signal applied to the terminal 80 and the logic ONE pulses for the PSC motor energizing signal occur during the logic ZERO of the SQW signal. With the phase relationship as indicated in FIG. 3b, the servomotor 20 will operate in a direction opposite from that established by a positive error signal as indicated in FIG. 3A.

Figure 4:
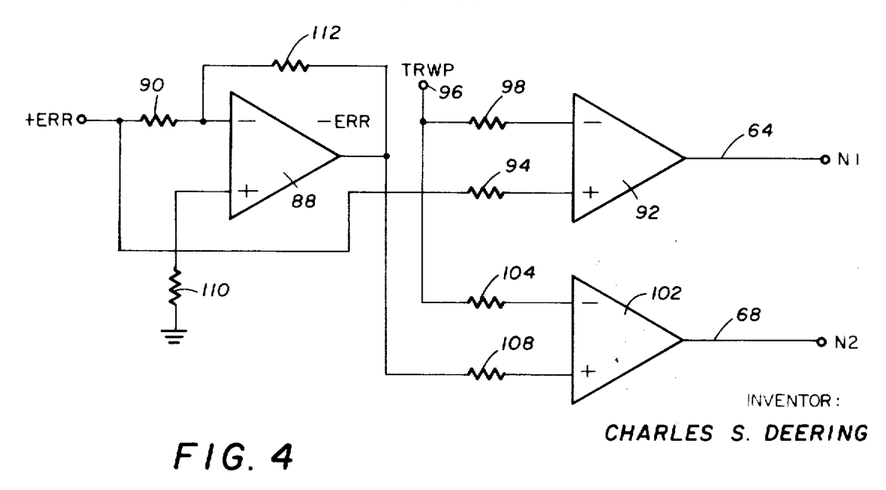
FIG. 4 is a schematic of a modification of the circuit of FIG. 2 when the error signal and the inverse of the error signal are compared with a linearly varying periodic function.

Referring to FIG. 4, there is shown a modification of the error signal comparing portion of the pulse width modulator of FIG. 2. The ERR signal is applied to one input of an inverting amplifier 88 through an input resistor 90. Also connected to receive the ERR signal is one input of a comparator amplifier 92. The ERR signal is applied to the input of the amplifier 92 through an input resistor 94. A second input to the comparator amplifier 92 is a linearly varying periodic function (TRWP) applied to a terminal 96 through resistor 98. Comparator amplifier 102 also has one input connected to the terminal 96 for receiving the TRWP signal through an input resistor 104. A second input to the amplifier 102 is the output of the inverter amplifier 88 connected through a resistor 108. The inverter amplifier 88 produces the inverse of the error signal at an output terminal. The inverter amplifier 88 may be an operational amplifier with a second input connected to ground through an input resistor 110 and a resistor 112 in a feedback loop.

In operation of the modification as illustrated in FIG. 4, the digital output signals from the amplifiers 92 and 102 are applied to the NAND gate logic of FIG. 2. The line 68, connected to the output of the comparator amplifier 102, corresponding with the line 68 connected to the output of the operational amplifier 50 and the line 64, connected to the output of the amplifier 92, corresponding with the line 64 connected to the output of the comparator amplifier 44.

Figure 5A:
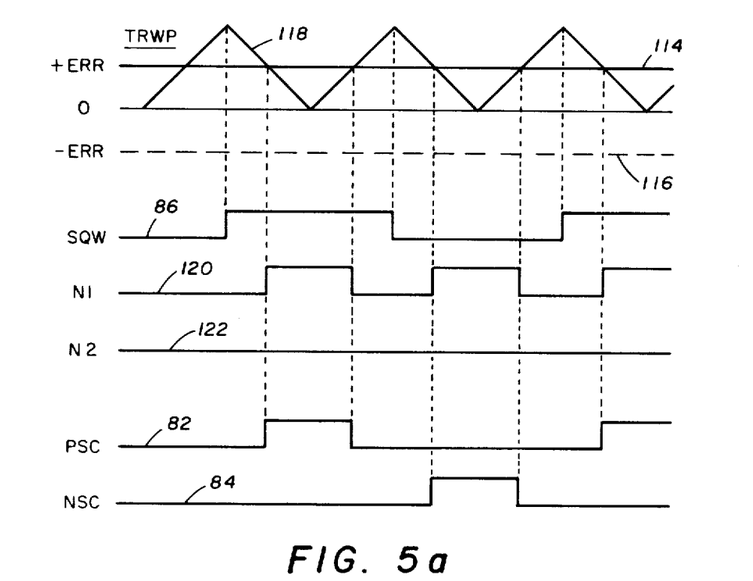
FIGS. 5a and 5b are wave forms showing the operation of the modification of FIG. 4 when receiving a positive or negative signal, respectively.
Figure 5B:
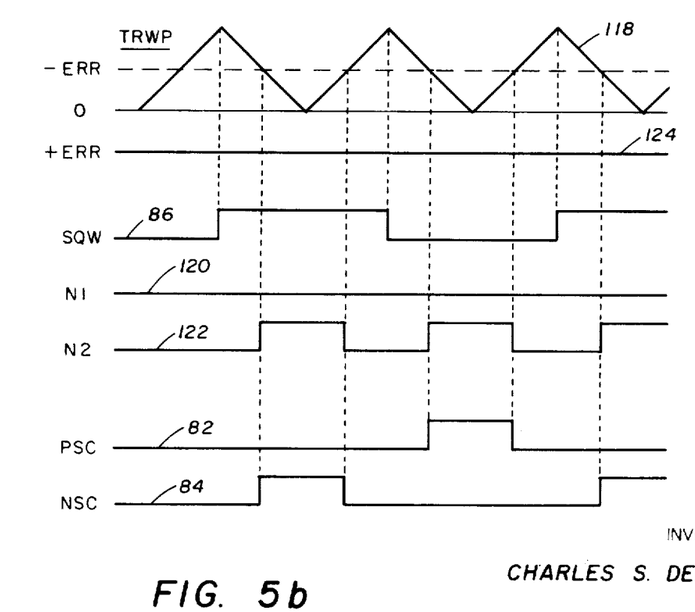

Referring to FIGS. 5a and 5b, the wave forms illustrate the operation of the modification of FIG. 4 connected to the NAND gate logic of FIG. 2. In FIG. 5a, the ERR signal connected to the input of the amplifier 88 is shown by the curve 114 and the inverse thereof, at the output of the amplifier 88, is shown by the curve 116. The TRWP signal is illustrated by the wave form 118 which is compared with the ERR signal and the inverse thereof in the amplifiers 92 and 102 respectively. In the amplifier 92, the ERR signal is compared with the TRWP signal to generate digital pulses on the line 68. If the TRWP signal is greater than or equal to the ERR signal, then the output of the amplifier 92 on the line 64 is at a logic ZERO level. When the ERR signal is greater than the TRWP signal, then then the output of the amplifier 92 on the line 64 is at a logic ONE level. The width of the pulse at the output of amplifier 92 is proportional to the magnitude of the ERR signal. Wave form 120 of FIG. 5a illustrates the output of the amplifier 92. Note, that this corresponds to the wave form 66 of FIG. 3a as generated at the output of the comparator amplifier 44.

In the comparator amplifier 102, the TRWP is compared with the inverse of the ERR signal. If the TRWP signal is greater than or equal to the inverse of the ERR signal (i.e., −ERR) then the output of the amplifier 102 on line 68 is at a logic ZERO level. When the −ERR is greater than the TRWP signal, then the output of the amplifier 102 will be at a logic ONE level. The expressions defining the output of the comparator amplifiers 92 and 102 are as given below:

Comparator 92 output = logic ZERO, if TRWP ≤ ERR
 = logic ONE, if TRWP < ERR
Comparator 102 output = logic ZERO, if TRWP ≥ −ERR = logic ONE, if TRWP < −ERR. When a positive ERR signal is applied to the line 36 of the modulator 10, the TRWP connected to the amplifier 102 will always be greater than the −ERR signal and the output of the amplifier 102 will be logic ZERO as illustrated by the wave form 122 of FIG. 5a.

The first and second series of pulses generated on the lines 64 and 68, respectively, are combined with the SQW signal in the NAND gate logic of FIG. 2 in the manner previously explained. The SQW signal is illustrated by the wave form 86 of FIG. 5a and the motor energizing signals, PSC and NSC, are given by the wave forms 82 and 84, respectively. These wave forms are identical to the wave forms similarly identified in FIG. 3a.

With an ERR signal as illustrated by the wave form 114, the servomotor 20 will have a direction of rotation in a predetermined direction. With the ERR signal applied to the amplifier 88 as given by the wave form 124 of FIG. 5b, the servomotor 20 will rotate in the reverse direction. With a negative error signal connected to the line 36 of the modulator 10, the TRWP signal applied to the comparator amplifier 92 will always be greater than the ERR signal and the output of the amplifier 92 will be at a logic ZERO level, as illustrated by the wave form 120. The inverse of the ERR signal will now be positive and when compared with the TRWP signal will generate a series of digital pulses on the line 68 at the output of the amplifier 102. This series of pulses is illustrated by the wave form 122 of FIG. 5B. With the outputs of the amplifiers 92 and 102 as given by the wave forms 120 and 122, respectively, the NAND gate logic of FIG. 2 produces the PSC and NSC motor energizing signal as given by the wave forms 82 and 84 of FIG. 5b. These digital signals are generated by combining with the SQW signal, as shown by the wave form 86.

In comparison with the embodiment shown in FIG. 2, the modification of FIG. 4 uses the TRWP signal applied to the terminal 96 and generates the inverse of the ERR signal at the output of the inverter amplifier 88. In the system of FIG. 2, the ERR signal was compared with the TRWP signal and the inverse thereof as generated by the inverting amplifier 40. The series of pulses proportional to error signal as appearing on lines 64 and 68 of both figures, along with the PSC and NSC signals, are identical for each circuit.

Figure 6:
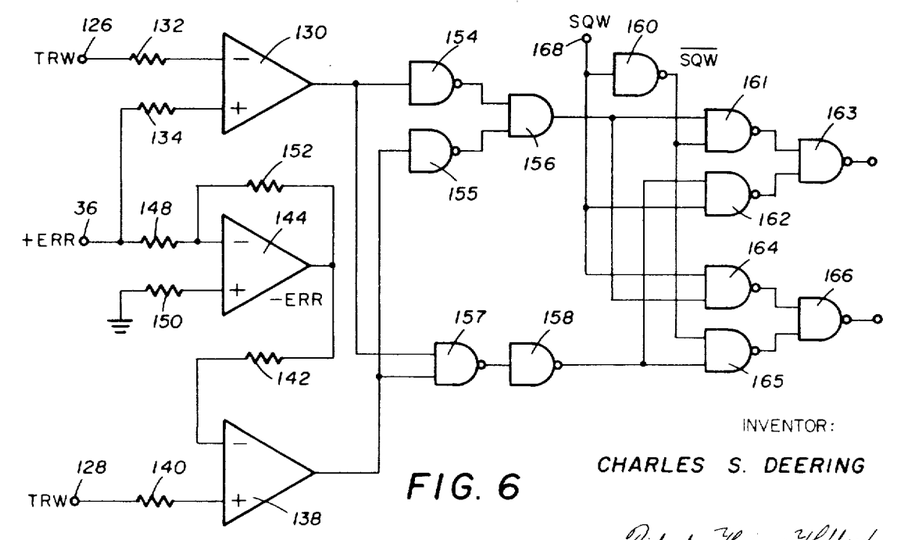
FIG. 6 is a schematic of an alternate embodiment of a pulse width modulator wherein the error signal and the inverse of the error signal are compared with a linearly varying periodic function that varies positive and negative about zero.

Referring to FIG. 6, there is shown an alternate embodiment of a pulse width modulator wherein the linearly varying periodic function varies positive and negative of a zero reference. In the systems in FIGS. 2 and 4, the TRWP contained only positive values.

In FIG. 6, the linearly varying periodic function varying positive and negative of zero (TRW) is applied to input terminals 126 and 128. Terminal 126 connects to one input of a comparator amplifier 130 through an input resistor 132. A second input to the amplifier 130 is the ERR signal connected through an input resistor 134. Terminal 128 connects to one input of a comparator amplifier 138 through an input resistor 140. A second input to the amplifier 138 is the inverse of the ERR signal connected through an input resistor 142 from the output of an inverting amplifier 144.

One input to the inverter amplifier 144 is the ERR signal applied through an input resistor 148. The second input of the amplifier 144 is connected to ground through a resistor 150. The amplifier 144 is an operational amplifier that inverts a signal applied to the input resistor 148 and includes a feedback loop of a resistor 152.

Comparator amplifiers 130 and 138 generate digital signals at the outputs in accordance with the following expressions:

$P1$ = logic ZERO, if TRW ≥ ERR
= logic ONE, if TRW < ERR
$P2$ = logic ZERO, if TRW ≤ −ERR
= logic ONE, if TRW > −ERR where $P1$ is the output of the amplifier 130, and
$P2$ is the output of the amplifier 138.

Output signals from the amplifiers 130 and 138 are combined logically in circuitry including NAND gates 154, 155, 157 and 158 and AND gate 156. The output of the amplifier 130 is connected to the NAND gates 154 and 157 and the output of the amplifier 138 is connected to the NAND gates 155 and 157. Thus, NAND 157 is a two-input circuit. Products formed at the output of the AND gate 156 and the NAND gate 158 are $\overline{P1 \cdot P2}$ and $P1 \cdot P2$ respectively. These products are combined logically with a periodic varying function (SQW) and the inverse of this function ($\overline{SQW}$) in a logic circuit including NAND gates 160 through 166. The intermediate series of digital pulses produced at the output of AND 156 are applied to inputs of the NAND gates 161, 162 and 164. An intermediate series of digital pulses produced at the output of NAND 158 is connected to NAND gates 162 and 165. A second input to NAND 165 and NAND 161 is the output of NAND 160. The output of NAND 160 is the $\overline{SQW}$ signal. Signal SQW appearing at the terminal 168 is applied to the second input of the NAND gates 162 and 164.

Products at the output of the AND gate 156 and NAND 158 are combined logically with the SQW and $\overline{SQW}$ signals to form the motor energizing signals, PSC and NSC, as applied to the power amplifier 12. The products $P1 \cdot P2$ and $\overline{P1 \cdot P2}$ are combined in accordance with the following logic expressions:

$$PSC = SQW \cdot (P1 \cdot P2) + \overline{SQW} \cdot (\overline{P1 \cdot P2})$$

$$NSC = SQW \cdot (\overline{P1 \cdot P2}) + \overline{SQW} \cdot (P1 \cdot P2).$$

Both the PSC and NSC pulse trains occur at frequency repetition rate established by the frequency of the SQW signal and have a width proportional to the absolute magnitude of the ERR signal.

Figure 7:
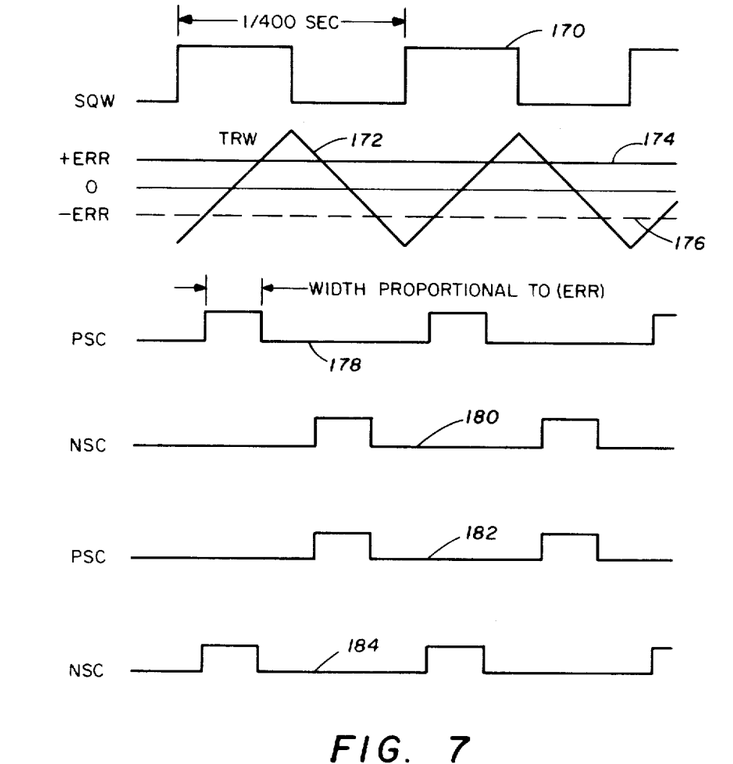
FIG. 7 is a series of wave forms illustrating the operation of FIG. 6 for both a positive and negative error signal, respectively.

Referring to FIG. 7, the wave forms illustrated show the operation of the pulse width modulator of FIG. 6. As an example, the frequency of the SQW signal and the TRW signal is 400 Hz. Signal SQW is illustrated by the wave form 170 and the TRW signal is illustrated by the wave form 172. Signal ERR and the inverse thereof are superimposed on the wave form of the TRW signal by the lines 174 and 176 respectively.

With a positive ERR signal applied to the input line 36, the motor energizing signals PSC and NSC generated at the output of the NAND gates 163 and 166, respectively, are illustrated by the wave forms 178 and 180. These signals are identical to those generated at the output of the NAND gates 75 and 78 of FIG. 2 and as given by the wave forms 82 and 84 of FIG. 3A. The servomotor 20 will have a predetermined direction of rotation when the motor energizing signals as given by the wave forms 178 and 180 are applied to the transistors 14 and 16, respectively. With a negative ERR signal applied to the line 36, the motor energizing signals PSC and NSC, at the output of the NAND gates 163 and 166, are given by the wave forms 182 and 184. These wave forms are identical to those of FIG. 3b as identified by the reference numerals 82 and 84. When applied to the power amplifier 12, they cause the servomotor 20 to rotate in the opposite direction from that established by the pulse trains given at the wave forms 178 and 180.

As a modification of the system of FIG. 6, the error signal comparing portion thereof may be replaced with the comparing circuit of FIG. 4. The outputs of the circuit of FIG. 4 at the amplifiers 92 and 102 are connected to the NAND gates 154, 155 and 157 in the arrangements as illustrated in FIG. 7.

While several embodiments of the invention, together with modifications thereof, have been described in detail herein and shown in the accompany drawings, it will be evident that various further modifications are possible without departing from the scope of the invention.

What is claimed is:

1. A system for controlling the energization of an alternating current load from a DC source in accordance with an error signal comprising:
   means for comparing a linearly varying periodic function with said error signal to generate a first series of pulses each having a width related to the magnitude of said error signal,
   second means for comparing a linearly varying periodic function with said error signal to generate a second series of pulses each having a width related to the magnitude of said error signal,
   phase selection circuit means for combining each of said series of pulses with a periodically varying function to produce a first and second energizing signal, the phase relationship of said first and second energizing signals controlling the phase energization of said load, and
   switching means actuated by said energizing signals to connect the DC power source to the load to produce an effective alternating current excitation thereof.

2. A system for controlling the energization of an alternating current load from a DC source in accordance with an error signal as set forth in claim 1 wherein said linearly varying periodic function is a triangular wave.

3. A system for controlling the energization of an alternating current load from a DC source in accordance with an error signal as set forth in claim 1 wherein said periodically varying function is a square wave logic signal.

4. A system for controlling the energization of an alternating current motor from a DC source in accordance with an error signal as set forth in claim 1 wherein said first and second energizing signals are separate digital pulse trains displaced electrically 180°.

5. A system for controlling an alternating current motor from a DC source in accordance with an error signal comprising:
   means for comparing a triangular shaped wave function with said error signal to generate a first series of pulses each having a width related to the magnitude of said error signal,
   means for inverting the triangular shaped wave function to generate the inverse thereof,
   means for comparing the inverted triangular shaped wave function with said error signal to generate a second series of pulses each having a width related to the magnitude of said error signal,
   phase selection circuit means for combining each of said series of pulses with a periodically varying function to produce a first and second motor phase energizing signal, the phase relationship of said first and second motor energizing signals controlling the phase energization and rotational direction of said motor, and
   switching means actuated by said motor energizing signals to connect the DC source to the motor winding to produce an effective alternating current excitation thereof.

6. A system for controlling an alternating current motor from a DC source in accordance with an error signal as set forth in claim 5 wherein said means for combining each of said series of pulses with a periodically varying function includes means for inverting said function to generate the inverse thereof.

7. A system for controlling an alternating current motor from a DC source in accordance with an error signal as set forth in claim 6 wherein said means for combining further includes logic components for producing the first motor energizing signal in accordance with the equation:

$$PSC = SQW \cdot M1 + \overline{SQW} \cdot M2$$

and additional logic components to produce the second motor energizing signal in accordance with the equation:

$$NSC = SQW \cdot M2 + \overline{SQW} \cdot M1$$

where
   PSC = the first motor energizing signal,
   SQW = the periodically varying function,
   M1 = the first series of pulses,
   $\overline{SQW}$ = the inverse of the periodically varying function,
   M2 = the second series of pulses, and
   NSC = the second motor energizing signal.

8. A system for controlling an alternating motor from a DC source in accordance with an error signal as set forth in claim 7 wherein said periodically varying function is a square wave.

9. A system for controlling an alternating current motor from a DC source in accordance with an error signal comprising:
   means for comparing a triangular shaped wave function with said error signal to generate a first series of pulses each having a width related to the magnitude of said error signal,
   means for inverting said error signal to generate the inverse thereof,
   means for comparing the inverted error signal with a triangular shaped wave function to generate a second series of pluses each having a width related to the magnitude of said error signal, phase selection circuit means for combining each of said series of pulses with a periodically varying function to produce a first and second motor phase energizing signal, the phase relationship of said first and second motor energizing signals controlling the phase energization and rotational direction of said motor, and switching means actuated by said motor energizing signals to connect the DC power source to the motor windings to produce an effective alternating current excitation thereof.

10. A system for controlling an alternating current motor from a DC source in accordance with an error signal as set forth in claim 9 including means for inverting said periodically varying function to produce the inverse thereof.

11. A system for controlling an alternating current motor from a DC source in accordance with an error signal as set forth in claim 10 wherein said means for combining further includes logic components for producing the first motor energizing signal in accordance with the equation:

$$PSC = SQW \cdot N1 + \overline{SQW} \cdot N2$$

and additional logic components to produce the second motor energizing signal in accordance with the equation:

$$NSC = SQW \cdot N2 + \overline{SQW} \cdot N1$$

where
PSC = the first motor energizing signal,
SQW = the periodically varying function,
N1 = the first series of pulses,
$\overline{SQW}$ = the inverse of the periodically varying function,
N2 = the second series of pulses, and
NSC = the second motor energizing signal.

12. A system for controlling an alternating current motor from a DC source in accordance with an error signal as set forth in claim 11 wherein said periodically varying function is a square wave.

13. A system for controlling an alternating current motor from a DC source in accordance with an error signal as set forth in claim 9 wherein said first and second motor energizing signals are displaced electrically 180°.

14. A system for controlling an alternating current motor from a source of direct current in accordance with an error signal comprising:

means for comparing a triangular shaped wave function varying plus and minus of zero with said error signal to generate a first series of pulses each having a width related to the magnitude of said error signal, means for inverting said error signal to generate the inverse thereof, means for comparing the triangular function with the inverted error signal to generate a second series of pulses each having a width related to the magnitude of said error signal, means for combining said first and second series of pulses to produce a first and second intermediate series of pulses, means for combining each of said series of intermediate pulses with a periodically varying function to produce a first and second motor energizing signal, the phase relationship of said first and second motor energizing signals controlling the rotational direction of said motor, and switching means actuated by said motor energizing signals to connect the DC power source to the motor windings to produce an effective alternating excitation thereof.

15. A system for controlling an alternating current motor from a DC source in accordance with an error signal as set forth in claim 14 wherein said means for combining each of said series of pulses with a periodically varying function includes means for inverting said function to produce the inverse thereof.

16. A system for controlling an alternating current motor from a DC source in accordance with an error signal as set forth in claim 15 including logic components to produce the first motor energizing signal in accordance with the equation:

$$PSC = SQW \cdot (P1 \cdot P2) = \overline{SQW} \cdot (\overline{P1 \cdot P2})$$

and logic components for producing the second motor energizing signal in accordance with the equation:

$$NSC = SQW \cdot (\overline{P1 \cdot P2}) + \overline{SQW} \cdot (P1 \cdot P2)$$

where
PSC = the first motor energizing signal,
SQW = the periodically varying function,
P1 = the first series of pulses,
P2 = the second series of pulses,
$\overline{SQW}$ = the inverse of the periodically varying function, and
NSC = the second motor energizing signal.

17. A system for controlling an alternating current motor from a DC source in accordance with an error signal as set forth in claim 16 wherein said periodically varying function is a square wave.

* * * * *